May 5, 1964 J. R. DAHME 3,132,264
DYNAMIC DATA STORAGE DEVICE EMPLOYING TRIGGERED SILICON CONTROLLED RECTIFIER FOR STORING
Filed Dec. 22, 1961
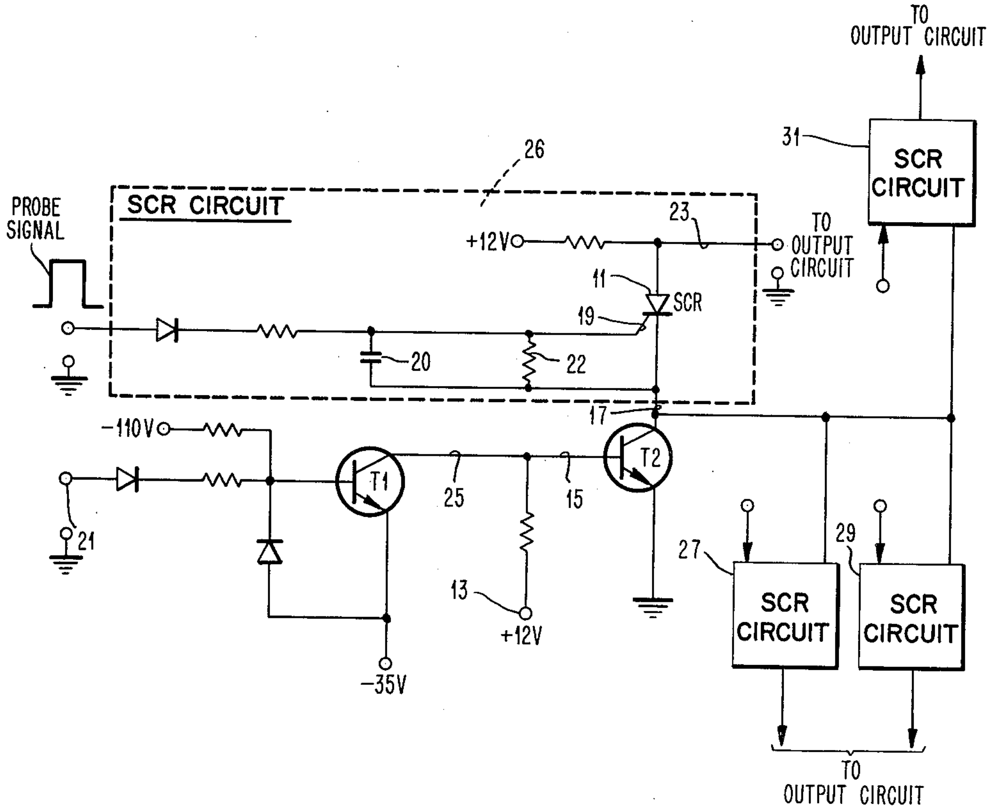
INVENTOR
JEROME R. DAHME
BY William E. Cleaver
ATTORNEY 3,132,264
Patented May 5, 1964

3,132,264

DYNAMIC DATA STORAGE DEVICE EMPLOYING TRIGGERED SILICON CONTROLLED RECTIFIER FOR STORING

Jerome R. Dahme, Strafford, Pa., assignor to Sperry Rand Corporation, New York, N.Y., a corporation of Delaware Filed Dec. 22, 1961, Ser. No. 161,495
2 Claims. (Cl. 307—88.5)

This invention relates to punch card readers and more particularly to high speed punch card readers.

As punch cards are passed through a reading station the holes therein are normally read by either having metal brushes dropping through the holes onto a metal contact roll and providing an electrical circuit therethrough or by means of light passing through the holes to light detectors. Although the two methods just mentioned are generally employed, other means for reading punched card holes such as star wheels, etc., might well be employed. Generally one brush or one beam of light is provided for each column. One row of the punch card is normally read at one instant of time and the card is then advanced to enable the next row to be entirely read at a subsequent instant of time. After information is read from the cards it is utilized in some way in a data processor (e.g. to punch other cards as in a reproducer machine or to be stored in a memory for later arithmetical operations as in a computer, etc.). In the general case a relatively large amount of time elapses (compared to the time for handling the signals electronically) during which the card is advanced from one row to the next row in the reading station. Since there is a substantial amount of time elapsing as the card passes from one row to the next, the information from a single row which has been read can be handled by scanning a few columns at a time and eventually scanning the complete row. Even though a row is scanned or the information is commutated, a few columns at a time, there still is sufficient time to electronically handle all the information in a single row.

In this way equipment can be saved because the information from a row need not all be read and handled at one time and therefore the same information handling equipment can be used many times to scan or read the information of the entire row. In order to accomplish this scanning, the information must be temporarily stored and accordingly it is an object of the present invention to provide an impoved temporary storage device to be used with a punch card reading mechanism.

It is a further object of the present invention to provide a temporary information storage device which is relatively insensitive to noise signals.

It is a further object of the present invention to provide a temporary information-storage device which has high speed readout and therefore which can be used with a high speed reading mechanism.

According to a feature of the present invention there is provided a silicon controlled rectifier whose gate element is connected to the input pulse means, whose anode is coupled to the output signal means, and whose cathode is coupled to the collector of a first transistor device. The silicon controlled rectifier is turned on and conducts through said first transistor in response to a hole in the card being read and the information represented by the hole is dynamically stored.

In accordance with another feature of the present invention there is provided a second transistor whose collector element is connected to the base element of said first transistor and whose base element is connected to a read-out circuit. This second transistor serves to control the bias on the first transistor so as to turn off said first transistor and consequently said silicon controlled rectifier when a read-out is desired.

In accordance with another feature of the present invention a plurality of said silicon controlled rectifiers are connected to the collector element of a single transistor (hereinafter referred to as a field transistor) which is assigned to read a punch card field or a predesignated group of columns from the card. As soon as at least one of the silicon controlled rectifiers is turned on, the field transistor will conduct. Hence when the field transistor is turned off all of the silicon controlled rectifiers which have been conducting will provide output signals from their respective anodes.

The above-mentioned and other features and objects of this present invention will become more apparent by reference to the following description taken in conjunction with the accompanying drawings in which:

The single figure is a schematic diagram of the circuit.

Consider that the present invention is operating in conjunction with a punch card reading device wherein brushes are dropped through the holes in the card onto a metal contact roller to provide an electrical circuit therethrough and therefore to provide a means for reading holes in the card. Although the present invention will be considered with such a device, it should be clearly understood that the present invention might well be used with some other types of input pulse means, such as a beam-of-light reader for punch cards.

Consider the detailed operation of the device in conjunction with the figure. In the quiescent state, i.e. prior to reading a card, neither transistor T1 nor transistor T2 is conducting nor is the silicon controlled rectifier 11 conducting. The transistor T2 is biased to conduct by virtue of the +12 volt potential being applied to the base 15 thereof, and hence if a positive potential is applied to the collector 17, the transistor T2 will conduct.

When a hole in a punch card is read, the read-in pulse swings from a negative voltage value to a positive voltage value and hence a positive potential is applied to the gate element 19 of the silicon controlled rectifier 11. This positive potential applied to the gate element 19 of the silicon controlled rectifier applies a positive potential to the collector of the transistor T2 thereby causing the transistor T2 to conduct. When current passes to the gate element 19 the silicon controlled rectifier commences to conduct. A silicon controlled rectifier operates quite similarly to a thyratron in that once it has been turned on, it will continue to conduct until either the cathode or the anode thereof is rendered an open circuit or the potential applied to these elements is greatly diminished.

When the silicon controlled rectifier is conducting the voltage at the output terminal approximates one volt. As has been suggested, once a hole in a card has been read the silicon controlled rectifier commences conducting and continues to conduct even though the input pulse (generated by the hole in the card) no longer exists. Consequently, the information represented by the hole is stored dynamically by a voltage at the output terminal, this voltage approximating +1 volt.

Subsequently, when it is necessary to determine which columns have had information punched therein, read-out pulses or a common read-out pulse is applied to the read-out terminals connected to the read-out transistor circuits, such as terminal 21 which turns on transistor T1. When the transistor T1 is conducting, a negative potential is developed at the collector 25 thereof which turns transistor T2 off. In response to the transistor T2 being turned off, the silicon controlled rectifier 11 is turned off. When the silicon controlled rectifier is turned off the voltage at the output terminal 23 rises sharply from +1 volt to approximately +12 volts indicating that there has been an information signal temporarily stored in the circuit and it is being read-out. Hence the information has been temporarily stored by the current conduction in the silicon controlled rectifiers.

The capacitor 20 serves to by-pass any transient signals or spurious spike signals which might erroneously trigger the silicon controlled rectifier 11. The resistor 22 serves to bias the silicon controlled rectifier so that the leakage current through the silicon controlled rectifier does not get erroneously turned on. The resistor 22 further serves to allow the capacitor 20 to discharge therethrough.

As indicated earlier and as depicted by the block diagram portion of the schematic (FIGURE 1), the collector 17 of transistor T2 is normally coupled to a plurality of silicon controlled rectifiers 26, 27, 29 and 31. Accordingly one read-out circuit, including a pair of transistors (such as transistors T1 and T2) is provided for a complete card field. If, for instance the card field is composed of only four columns, then the four columns can be read and stored by the four silicon controlled rectifiers 26, 27, 29 and 31. A commutator or a scanning circuit (not shown) can be employed to pulse each of the read-out transitsors, similar to transistor T1. The output signals from the silicon controlled rectifier circuits are transmitted in parallel form to the utilization circuit, which may be a permanent memory of some form, or relays which activate a punching mechanism, etc.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pulse read-in circuit for use in a punch card reading device comprising:
   - a silicon controlled rectifier having a gate element, an anode element and a cathode element;
   - input signal means connected to said gate element of said silicon controlled rectifier;
   - output signal means connected to said anode of said silicon controlled rectifier;
   - first and second transistors each having an input element, an output element and a control element;
   - said input and said output element of said first transistor coupled to said cathode of said silicon controlled rectifier and to ground potential, respectively;
   - biasing means coupled to said control element of said first transistor to provide a bias thereto which would normally drive said first transistor device into conduction;
   - said output element of said second transistor coupled to said biasing means to develop a cut-off voltage potential thereat in response to the conduction of said second transistor;
   - read-out signal means connected to said control element of said second transistor to cause said second transistor to conduct in response to said read-out signal, thereby causing the voltage appearing at said input element of said second transistor to be shifted to said output element thereof with little attenuation, to thus provide said cut-off bias at said control element of said first transistor;
   - said silicon controlled rectifier conducting through said first transistor in response to an input signal being applied to said input signal means and terminating said conduction in response to said read-out signal being applied to siad second transistor to provide a signal to said output signal means,
   - said silicon controlled rectifier remaining in a state of non-conduction until the next input signal is applied thereto.

2. A pulse read-in circuit for use in a punch card reading device comprising: a silicon controlled rectifier having a gate element, an anode element and a cathode element; input signal means connected to said gate element of said silicon controlled rectifier; output signal means connected to said anode of said silicon controlled rectifier; first and second transistors each having an input element, an output element and a control element, said input and said output element of said first transistor coupled to said cathode of said silicon controlled rectifier and to ground potential, respectively; biasing means coupled to said control element of said first transistor to provide a bias thereto which would normally drive said first transistor device into conduction, said output element of said second transistor coupled to said biasing means to develop a cut-off voltage potential thereat in response to the conduction of said second transistor; read-out signal means connected to said control element of said second transistor to cause said second transistor to conduct in response to said read-out signal, thereby causing the voltage appearing at said input element of said second transistor to be shifted to said output element thereof with little attenuation to thus provide said cut-off bias at said control element of said first transistor; a capacitor connected between said gate element of said silicon controlled rectifier and said input element of said first transistor to provide a path for spurious input signals; a resistor coupled across said capacitor to provide a control bias for said silicon controlled rectifier to keep it from erroneously conducting and to further provide a discharge path for said capacitor, said silicon controlled rectifier conducting through said first transistor in response to an input signal being applied to said input signal means and terminating said conduction in response to said read-out signal being applied to said second transistor to provide a signal to said output signal means, said silicon controlled rectifier remaining in a state of non-conduction until the next input signal is applied thereto.

References Cited in the file of this patent

UNITED STATES PATENTS

| | | |
|---|---|---|
| 2,460,455 | Hurley | Feb. 1, 1949 |
| 2,864,007 | Clapper | Dec. 9, 1958 |